United States Patent [19]

Pino

[11] Patent Number: 5,402,828
[45] Date of Patent: Apr. 4, 1995

[54] CLOSURE DEVICE WITH DUAL-MANDREL-ACUTATED PERIPHERAL SEAL

[76] Inventor: Richard Pino, 2640 Janson Dr., Chesapeake, Va. 23321

[21] Appl. No.: 56,484

[22] Filed: May 4, 1993

[51] Int. Cl.$^6$ ............................................. F16L 55/12
[52] U.S. Cl. ........................................ 138/93; 138/89; 576/203
[58] Field of Search ............................. 138/89, 90, 93; 376/203, 204

[56] References Cited

U.S. PATENT DOCUMENTS

| | | |
|---|---|---|
| 2,855,003 | 10/1938 | Thaxton . |
| 3,025,606 | 3/1962 | Turner ................................. 138/104 |
| 3,254,012 | 5/1966 | Ziegler ................................. 138/103 |
| 3,593,749 | 7/1971 | Reardon .............................. 138/93 |
| 3,882,382 | 5/1975 | Johnson .............................. 138/104 |
| 3,971,416 | 7/1976 | Johnson .............................. 138/104 |
| 4,013,924 | 3/1977 | Cristensen et al. ................. 138/104 |
| 4,029,889 | 6/1977 | Mizuochi ............................ 138/104 |
| 4,250,926 | 2/1981 | Satterthwaite . |
| 4,288,654 | 9/1981 | Blom et al. ......................... 138/104 |
| 4,487,057 | 12/1984 | Lutz .................................... 138/104 |
| 4,518,015 | 5/1985 | Fischer ................................ 138/93 |
| 4,637,588 | 1/1987 | Wilhelm et al. .................... 138/93 |
| 4,797,621 | 1/1989 | Anderson et al. .................. 138/104 |
| 4,800,128 | 1/1989 | Schacht et al. ..................... 138/104 |
| 4,827,984 | 5/1989 | Young et al. ....................... 138/93 |
| 4,848,406 | 7/1989 | Stauner et al. ..................... 376/204 |
| 5,119,861 | 6/1992 | Pino . |
| 5,172,730 | 12/1922 | Driver ................................. 138/104 |
| 5,293,905 | 3/1994 | Friedrich ............................ 138/89 |

FOREIGN PATENT DOCUMENTS 2081838  2/1982  United Kingdom ................. 138/93

Primary Examiner—James E. Bryant, III
Attorney, Agent, or Firm—Stephen E. Clark

[57] ABSTRACT

Pipe closure device with opposing dual mandrels has external conical surfaces which cooperate with internal conical surfaces of segmented rigid wall engagement member. Rotation of threaded shaft causes relative axial movement of dual mandrels and effects outward radial motion of rigid wall engagement members and outward motion of elastomeric seal, securing device to wall of pipe and sealing pipe closed. Rotation of shaft in opposite direction releases elastomeric seal and rigid wall engagement members from pipe wall. Inflatable seal seals against inside wall of pipe when inflated. Shaft is rotated by air-powered motor which is insertable and attachable into sealed receiver without use of tools.

6 Claims, 14 Drawing Sheets

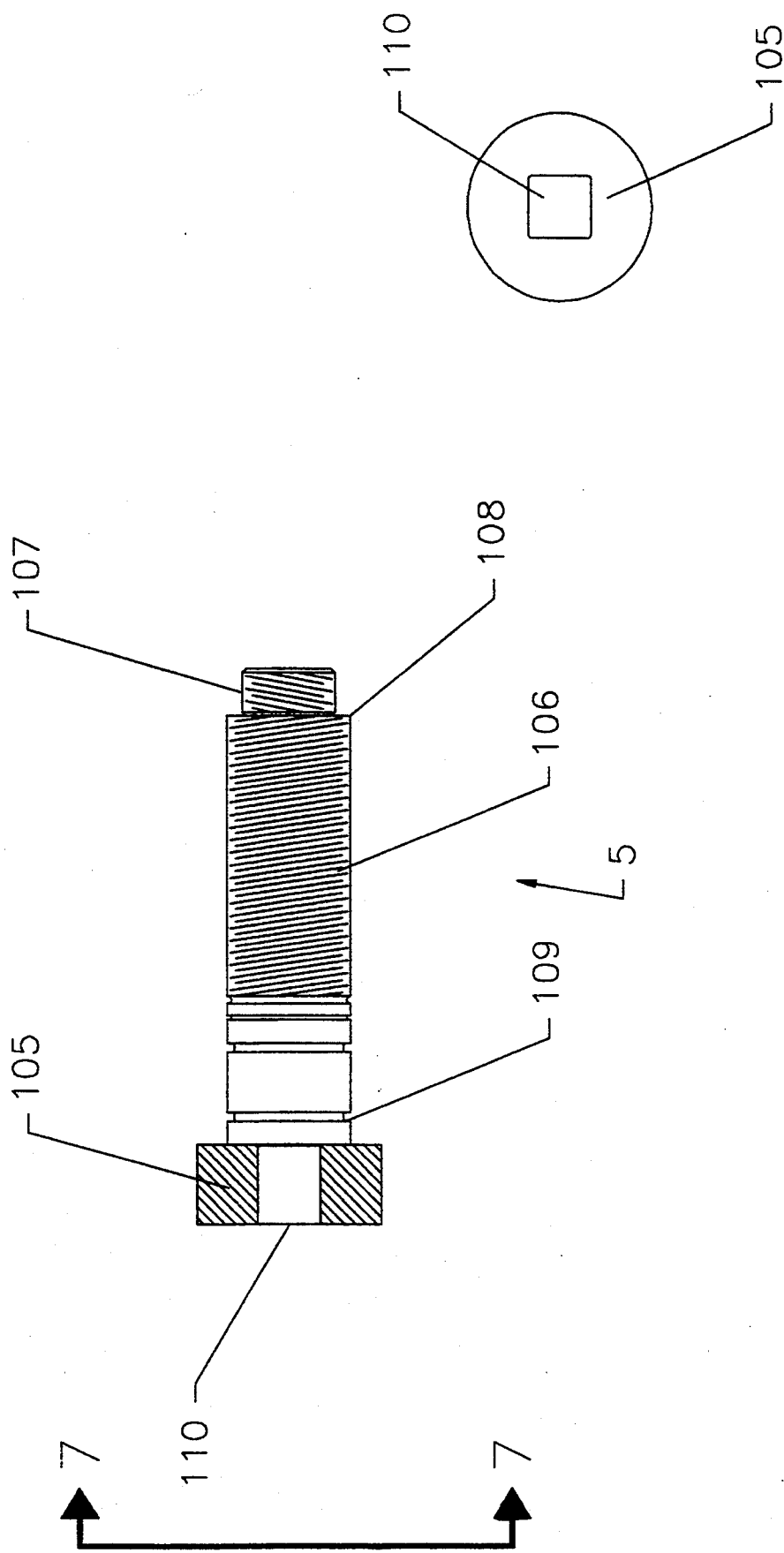

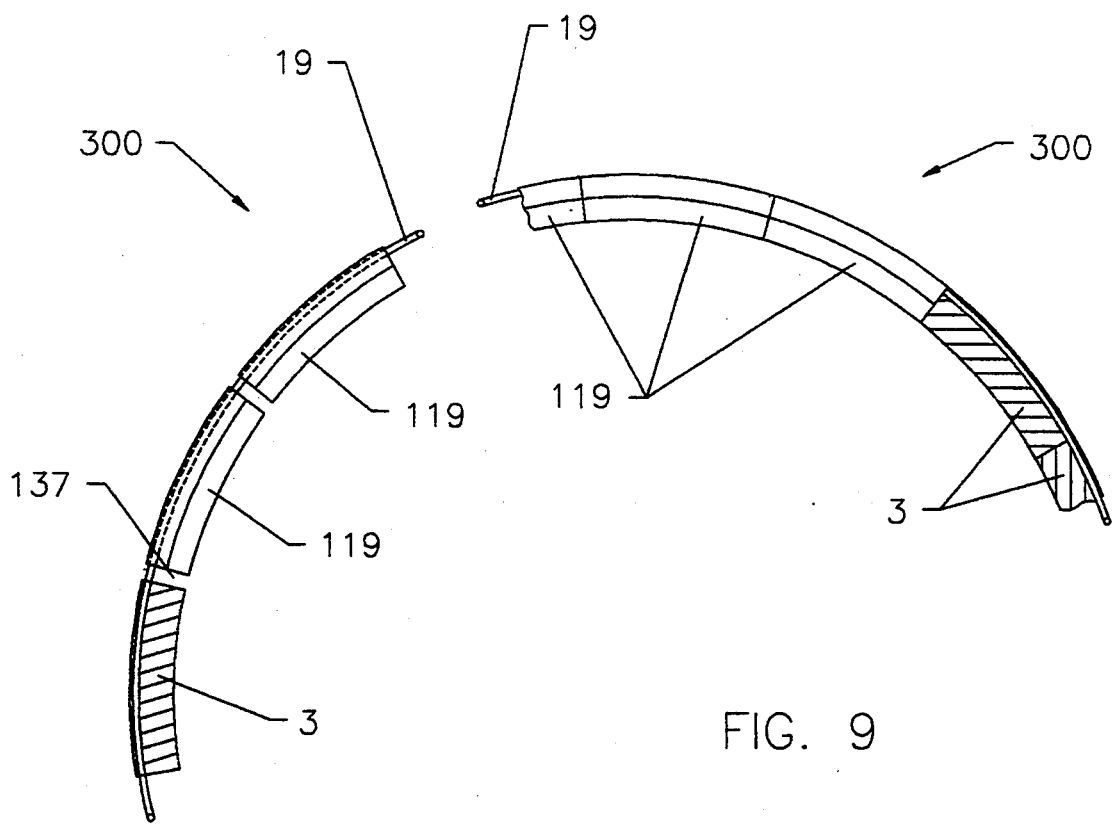
FIG. 8
FIG. 9
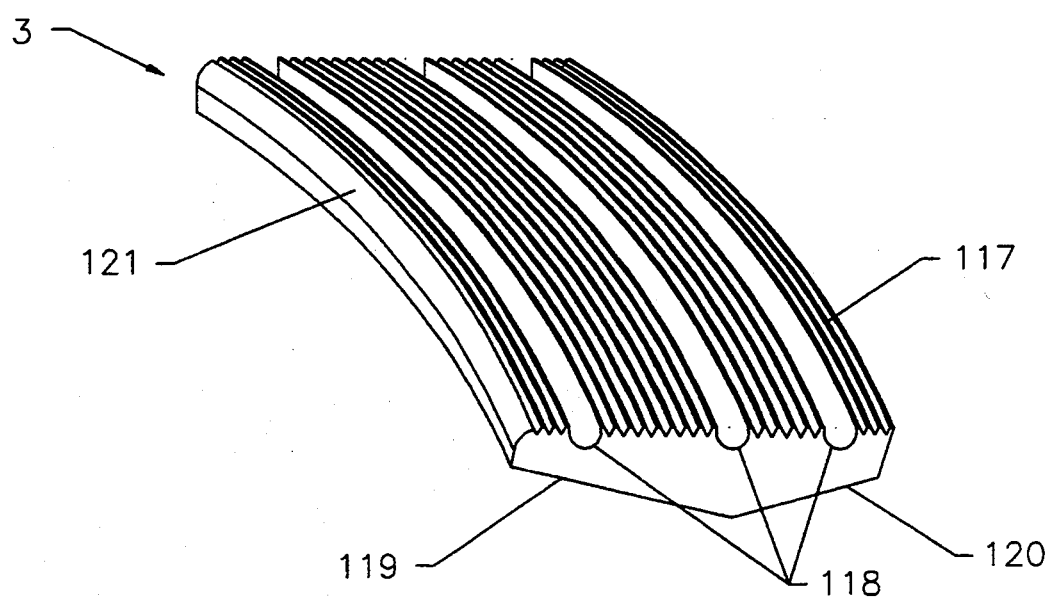
FIG. 10

CLOSURE DEVICE WITH DUAL-MANDREL-ACUTATED PERIPHERAL SEAL

BACKGROUND OF THE INVENTION

1. Field of Invention

The present invention relates to a pipe closure. More particularly, the present invention relates to a closure device that is insertable into a circular pipe, and which radially expands in response to mechanically induced axial contraction so as to effect a seal between the device and the inside wall of the pipe.

2. Description of the Prior Art

The present invention is particularly well adapted to be used as a test plug to close the open end of a submerged pipe for the pressure testing thereof, and for isolation of the pipe and and radioactive water. In the nuclear power industry, nuclear reactors typically comprise large diameter; vertically upright reactor vessels served by a plurality of (perhaps three or four) steam pipe lines which terminate at, and radially extend outboard from the wall of the reactor vessel. These substantially horizontal steam pipe lines each are provided with a closure valve which is intended to maintain a water-tight seal at pressures up to 60 psi. When shut down (i.e. for repair, maintenance, etc), the entire reactor vessel is flooded with water to shield radiation, with the entrance to the steam pipes in the wall of the reaction vessel being typically 40 feet beneath the surface of the water. The water over the radioactive fuel acts as a shield from radiation to the maintenance workers above the water.

It is desirable to periodically repair and pressure test the steam pipe closure valves. In order to repair a steam valve, the pug is inserted in the pipe line, and the pipeline downstream of the plug is draind. The steam valve is then repaired and tested by insertinserting a second valve, (a "test plug"), into the entrance to the steam pipe at the wall of the reactor vessel so as to isolate a section of the steam pipe between the "test plug" and the steam pipe closure valve, then close the "test plug" and pressurize the isolated section of the pipe. After the pressure test is completed, it is desirable to remove the "test plug" from the steam pipe. It is desirable that the insertion and removal of the test plug be accomplished remotely, that is: from above the surface of the water in reactor vessel, and, in particular, without requiring that any personnel be immersed or otherwise submerged in the water because draining down or the reactor to insert the plug manually would expose worker to harmful radiation levels.

Many prior removable pipe plugs are known which isolate sections of pipe and which have been used in the past as test plugs. Three general classifications of such prior are known. The first general classification of prior removable pipe plugs includes devices comprising an inflatable-seal which engages the pipe wall when the inflatable seal is pressurized, (for example; U.S. Pat. No. 4,250,926). The second type of prior removable pipe plugs includes devices comprising an elastomeric seal which nominally fits inside of the pipe, but which radially expands to engage the wall of the pipe when the axial ends of the device are longitudinally drawn towards each other by mechanical means. Prior pipe plug devices of the third general classification include elastomeric seals configured in a "fail safe" construction such that the elastomeric seal always engages the pipe wall, except when the device is mechanically elongated axially so as to cause the elastomeric seal to radially contract, (for examples U.S. Pat. No. 5,119,861).

A problem of these prior pipe plug devices is that, because of the relatively low dimensional clearance between the sealing member and the inside wall of the pipe, such devices are not well suited for remote insertion into pipes, such as by robotic arms and the like.

Another problem of these prior pipe plug devices is that when they are constructed to have sufficient clearance between the sealing member and the inside of the pipe wall to facilitate remote insertion of the plug into the end of a pipe, such plugs typically don't have sufficient radial movement to effectively seal against high pressures. Those prior pipe plugs which retract to sufficiently small diameters for remote insertion into pipes, and which have sufficient radial-expansion capabilities to engage the interior pipe wall, typically rely upon an inflatable seal member to provide not only the seal between the device and the pipe but also the frictional force to restrain the device from being axially displaced along the pipe wall.

Another problem of such prior pipe plugs is that once the plug has initially inserted into a test pipe, the sealing member is typically induced to engage the wall of the pipe by one end of the plug being fixed while an opposite end is drawn toward it, thus causing one end of the sealing member to axial move while its opposite end remains stationary. Such axial movement of only one end of the sealing member typically causes the periphery of the sealing member to axially move along the pipe wall as the device is being "tightened", which movement may damage the sealing member.

Another problem with many prior pipe plugs is that once they are left in place for an extended period of time, they may become stuck inside of the pipe and difficult to remove, particularly from remote locations.

Another problem with prior pipe plugs is that it is extremely difficult, if not possible, to determine from a remote location whether or not the plug has properly closed against the pipe wall, (or whether or not the plug has properly released the pipe wall during plug removal operations), without conducting pressure tests on the plug.

Some prior pipe plug devices rely upon air driven equipment integrally constructed to the device to effect a torquing of axially threaded member so as to effect either the longitudinal contraction or extension of the device so as to cause an elastomeric member to either engage or disengage the pipe wall, respectively. In the event of failure of such air driven equipment, is it is difficult, if not virtually impossible, to replace or repair such equipment from a remote location.

Some prior pipe plugs require a constant source of air pressure in order to maintain a seal. In the event of failure or loww of the air supply, the seal in such prior devices is broken.

Another problem with prior pipe plug devices is that in many cases those plugs which are adapted to seal and restrain against hydrostatic pressure from one side of the plug are not equally well adapted to seal and restrain against hydrostatic pressure from the other side of the plug.

OBJECTS OF THE INVENTION

Accordingly, it is a primary object of the present invention to provide a closure device that is insertable into an open end of a pipe, and which radially expands in response to mechanically induced axial contraction so as to effect a seal between the device and the inside wall of the pipe.

It is another object of the present invention to provide a closure device of the character described which is particularly well adapted to be used as test plug to close the open end of a submerged pipe for the pressure testing and isolation thereof.

It is another object of the present invention to provide a closure device of the character described having sufficient dimensional clearance to facilitate its remote insertion into an open end of a submerged pipe.

It is another object of the present invention to provide a closure device of the character described having an elastomeric sealing member being capable of sufficient radial movement to effect an positive seal against the interior wall of a pipe, and which has rigid wall-engaging members capable of sufficient radial movement and sufficient radial force to restrain the device from axial movement parallel to the axis of the pipe.

It is another object of the present invention to provide a closure device of the character described wherein the rigid wall-engaging members may be selectively actuated from a remote position so as to advantageously effect their engagement and disengagement with the pipe wall.

It is another object of the present invention to provide a closure device of the character described wherein the radial expansion of the sealing member is accomplished without effecting an axial shearing force between the sealing member and the wall of the pipe.

It is another object of the present invention to provide a closure device of the character described in which the axial contraction and expansion of the sealing member is effected by a pneumatic driving member, and wherein the pneumatic driving member is can be readily removed from the rest of the device (from a remote location) in the event of failure of the pneumatic driving member.

It is another object of the present invention to provide a closure device of the character described wherein it may be easily determined (from a remote location) whether or not the sealing member is engaged with the inside wall of the pipe.

It is another object of the present invention to provide a closure device of the character described which, in the event of failure of its actuation shaft, can be removed by removal of flange bushing bolts.

It is another object of the present invention to provide a closure device of the character described which is well suited for long duration installations, and which has a positive mechanical locking and sealing means.

Further objects and advantages of the invention will become apparent from a consideration of the drawings and ensuing description thereof.

BRIEF DESCRIPTION OF THE DRAWINGS

FIG. 6 is a side elevation of the actuation shaft of the present invention;

FIG. 7 is a front elevation of the actuation shaft taken along the lines 7—7 of FIG. 6;

FIG. 8 is front elevation of the grip assembly of the present invention, shown in an expanded configuration;

FIG. 9 is a front elevation of the grip assembly similar to FIG. 8, but showing the grip assembly in a retracted configuration;

FIG. 10 is a perspective view showing the details of construction of a grip segment of the present invention;

SUMMARY OF THE INVENTION

Figure 1:
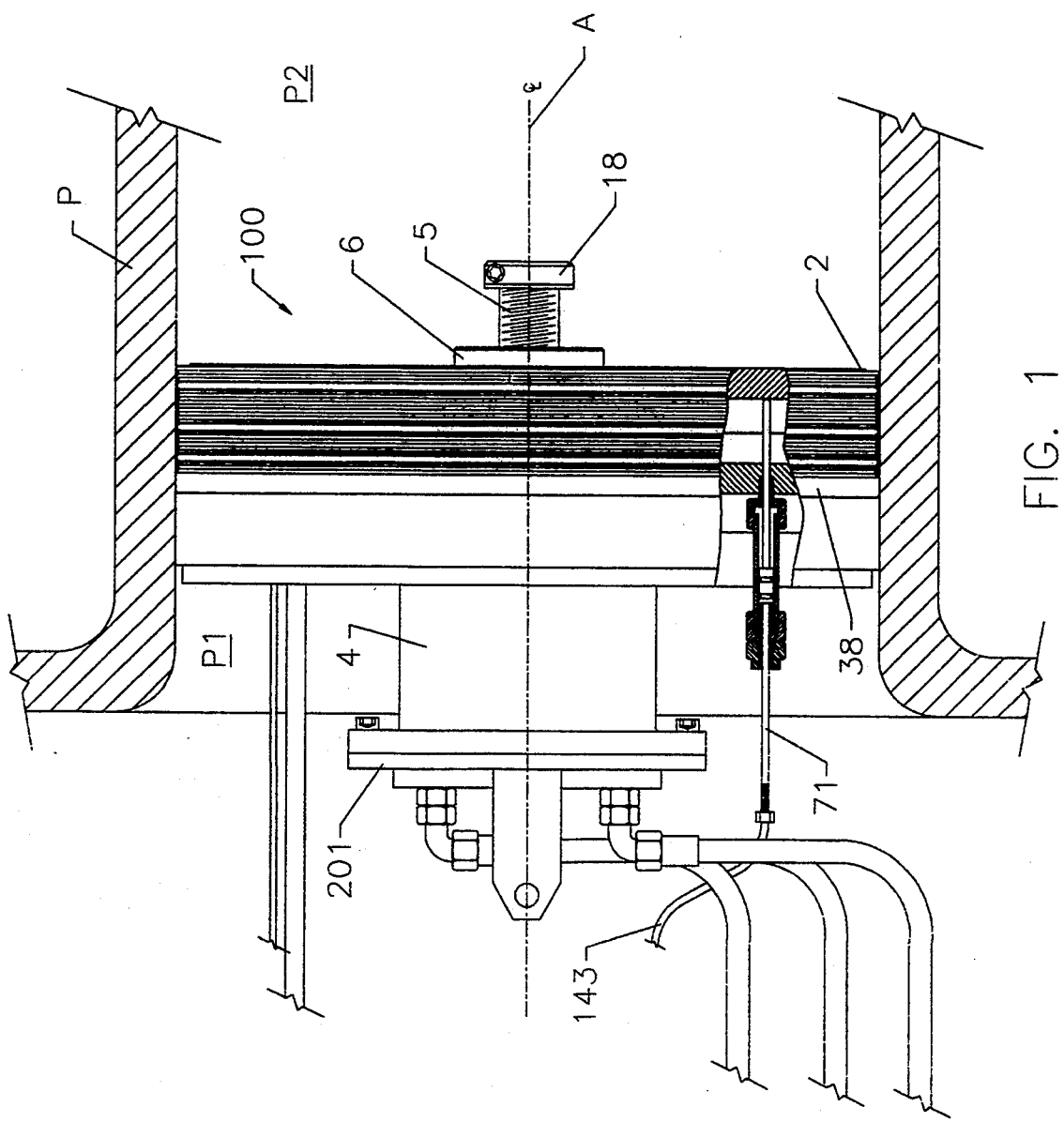
FIG. 1 is a side view of the preferred embodiment of the present invention shown in partial cross-section, illustrated in the operatively sealed position inside of a conduit.

Description of the Preferred Embodiment of the Invention

The preferred embodiment of the invention is a remotely actuated closure device (generally designated 100 in the figures) which may be readily inserted into an open end of a straight section of pipe (P). The following disclosure describes the sizes and geometry of a preferred embodiment of a closure device, constructed in accordance with the present invention, adapted for use in sealing a nominal 24 inch (23¾" actual inside diameter) pipe. However, the sizes and geometry given are exemplary only, as the present invention can be modified as necessary for use inside of pipes and orifices of a wide range of diameters. The closure device 100 comprises a pair of opposing mandrels, hereinafter designated "pressure plate" 2 and compression plate 38, respectively, about which is assembled a grip assembly 300.

Figure 3:
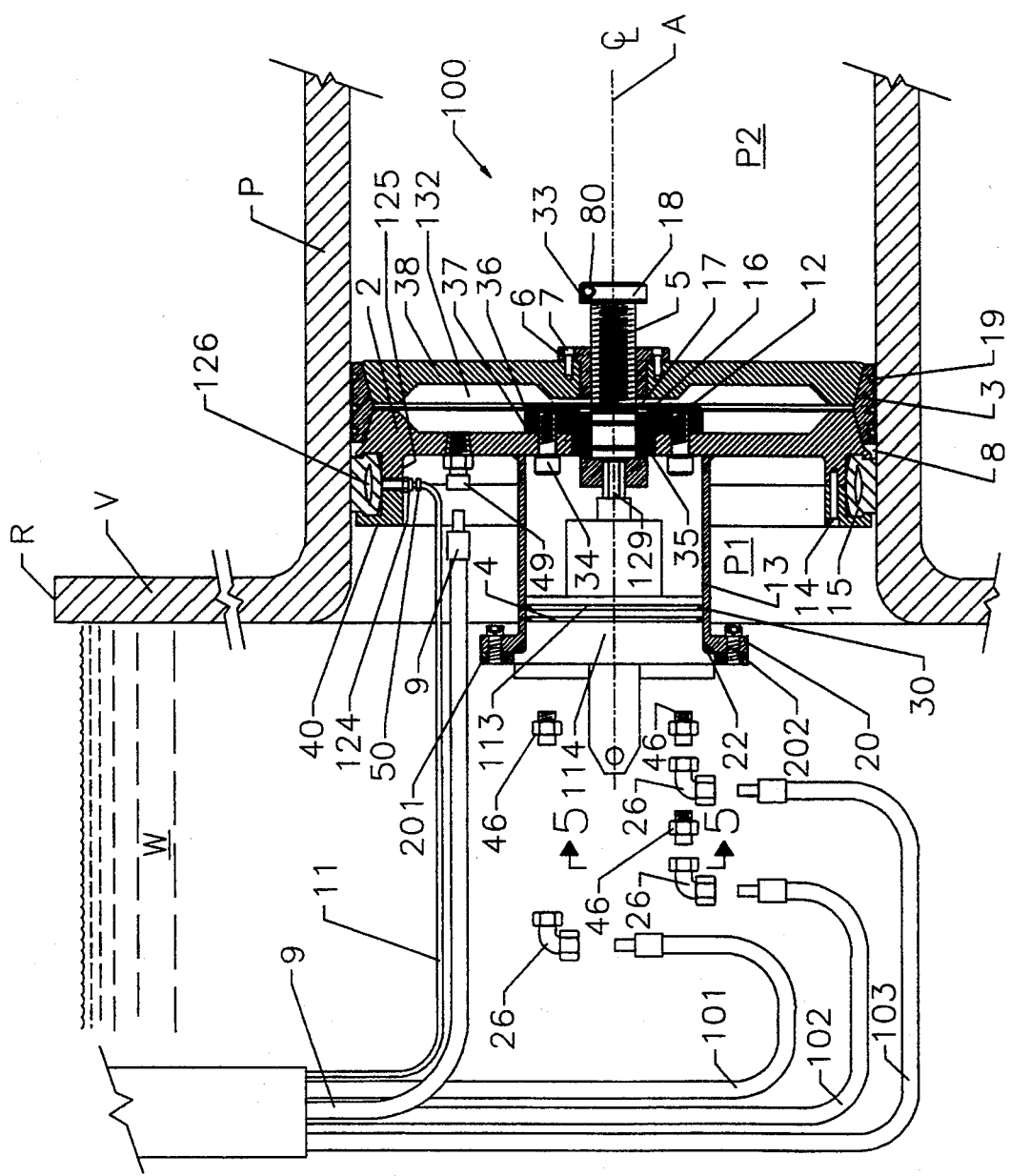
FIG. 3 is a medial cross-sectional view of the present invention illustrated in the operatively sealed position inside of a conduit.

Referring to FIG. 3: The closure device 100 comprises a pressure plate 2 constructed of hard coated 6061 aluminum that is substantially symmetric about a longitudinal axis A, and is aligned with a compression plate 38 which is also constructed of hard coated 6061 aluminum. The pressure plate 2 and the compression plate 38 are aligned about a 2-inch diameter, partially threaded, actuation shaft 5.

Figure 14:
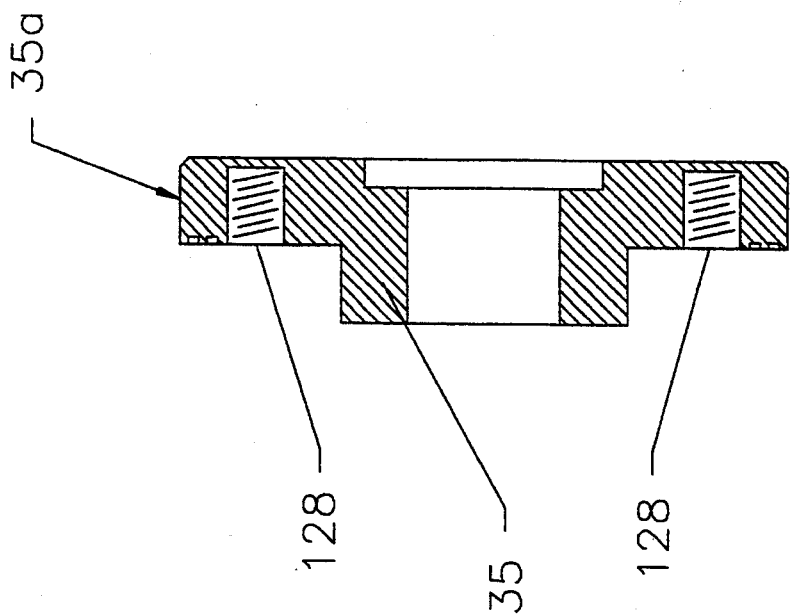
FIG. 14 is a cross-sectional view of the flange bushing taken along the lines 14—14 of FIG. 13.
Figure 13:
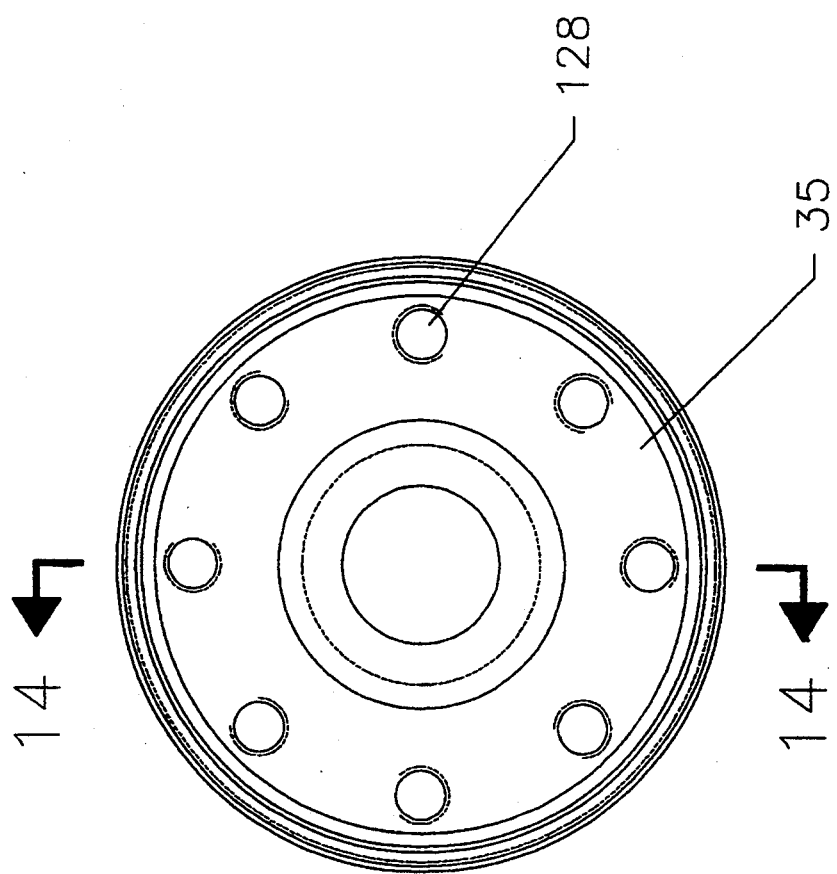
FIG. 13 is a front elevation of the flange bushing of the present invention.
Figure 15:
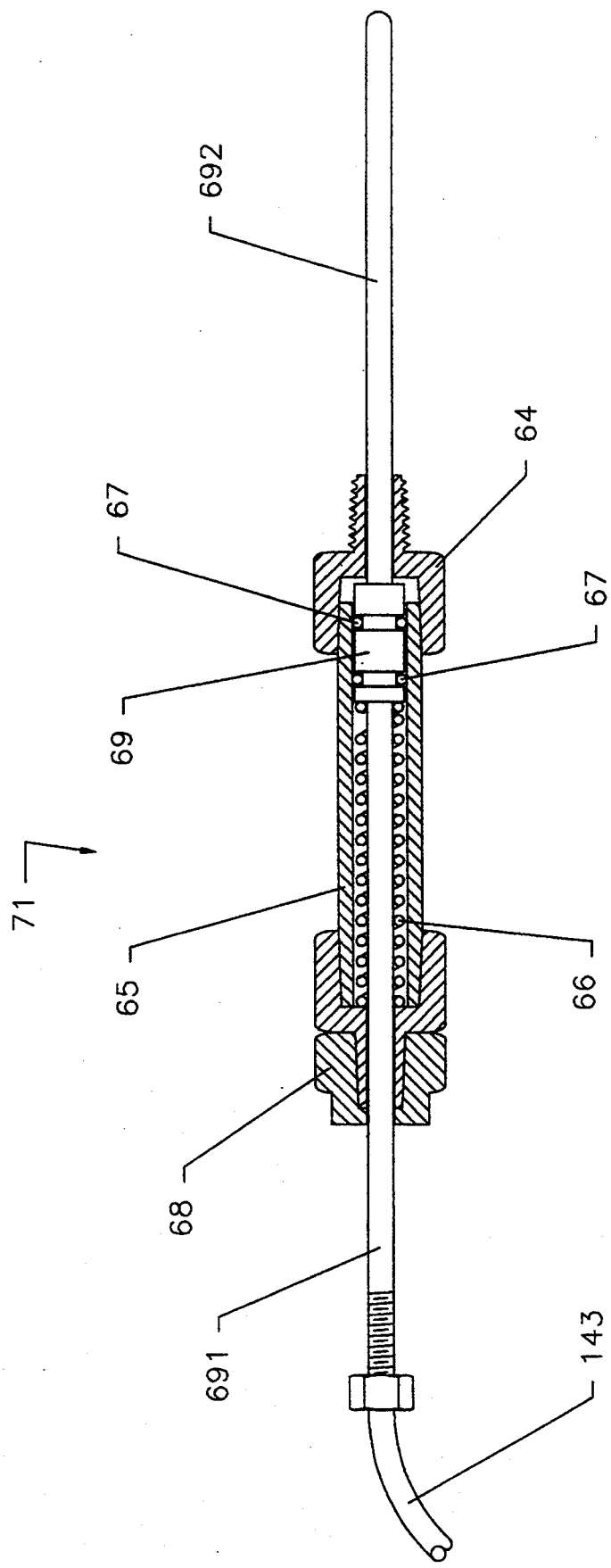
FIG. 15 is a medial cross-sectional view of the position indicator assembly used in the present invention.
Figure 16:
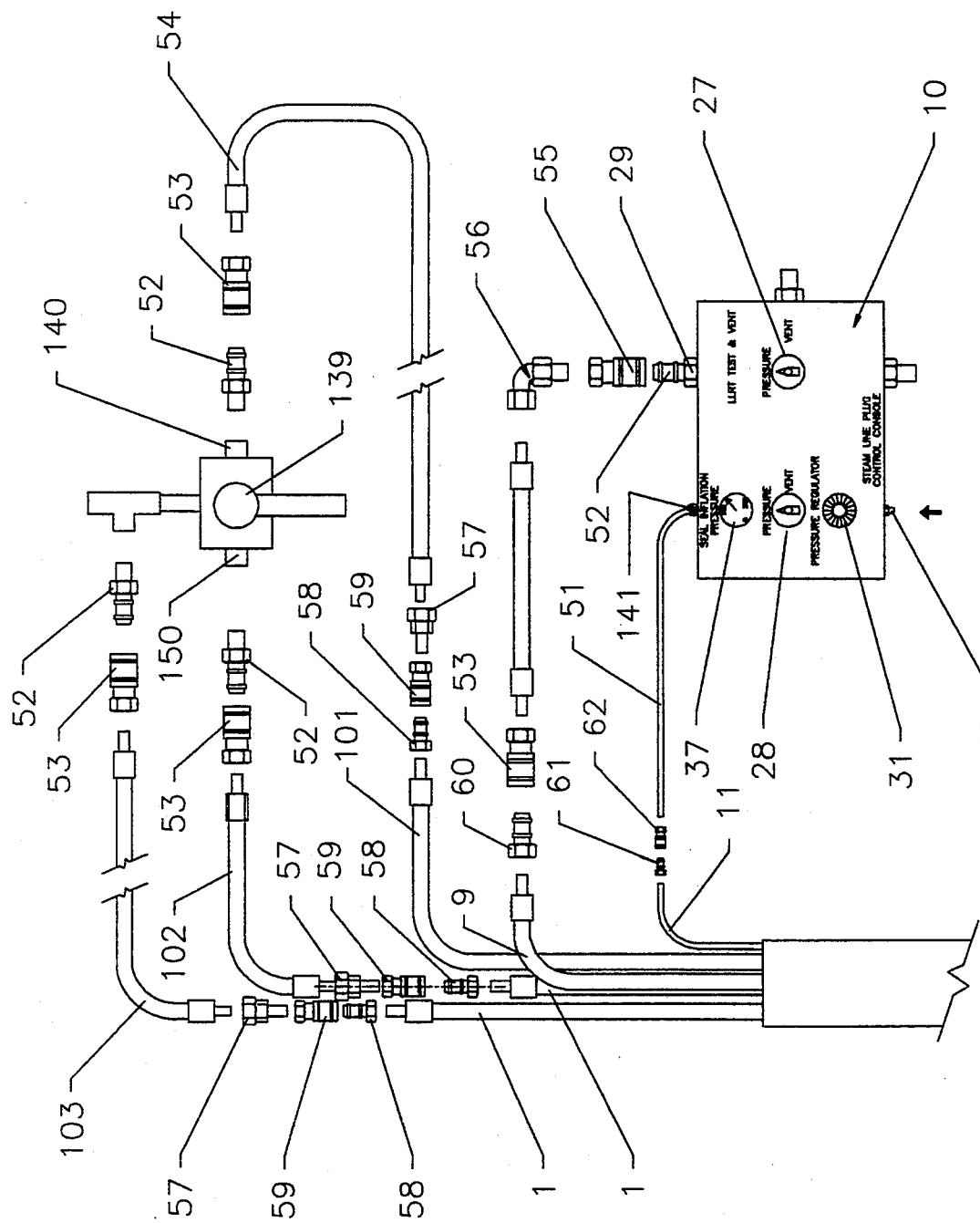
FIG. 16 is a schematic illustration of the pneumatic controls used in the present invention.

The actuation shaft 5 is provided at one end with a head 105 having a blind square recess 110 therein, (as shown in detail in FIGS. 6 and 7). The actuation shaft 5 is right-hand threaded 106 intermediately along its length, and has a stepped down shoulder 108 which is left-hand threaded 107. The actuation shaft 5 passes through a flange bushing 35. The flange bushing comprises a cylindrical bearing portion 35b, which permits relative movement between the pressure plate 2 and the actuation shaft 5. The flange bushing, which is shown in detail in FIGS. 13 and 14, also comprises a flange portion 35a, which extends from the cylindrical bearing portion 35b and which is of relatively larger outside diameter than the bearing portion 35b. O-rings 12 fit in grooves 109 in the actuation shaft and provide a seal between the actuation shaft 5 and a stainless steel flange bushing 35. The flange bushing 35 is secured to the front side 2b of the pressure plate 2 by socket head cap screws 34 which extend from the backside 2a of the pressure plate through clearance holes 127 in the pressure plate 2, and into blind threaded holes 128 in the flange portion 35a of the flange bushing 35.

Cylinder 13, which is preferably constructed of 8-inch schedule 40 pipe made of hard coated 6061 aluminum, has a flange 20 at one end, and is welded 111 to the back side 2a of pressure plate 2 at its other end. The cylinder 13 is chamfered 112 so as to accommodate an O-ring seal 22 when an air impact motor tool 4 is inserted into the cylinder 13. O-rings 30 are also provided in grooves 113 in the air impact motor tool housing 114, so as to provide a seal between the air impact motor tool housing 114 and the cylinder 13.

An internally threaded 2-inch flange nut 6 is secured to the back side 38a of the compression plate 38 by stainless steel socket head cap screws 7. The internally threaded flange nut 6 is engaged with the external right-hand threads 106 of the actuation shaft 5, so that when the actuation shaft turns, the flange nut 6 (and the compression plate 38 attached thereto) moves in a direction parallel to the axis A of the device. A stainless steel left-hand threaded locknut 18 and a zinc plated steel thrust washer 33 are secured to the shouldered end 108 of the actuation shaft 5 to prevent the compression plate 38 from becoming displaced beyond the end of the actuation shaft 5.

The frontside face 2b of the pressure plate faces the frontside face 38b of the compression plate. The outboard edge 115 of the compression plate is tapered such that the diameter to the outboard edge 115 is greater towards the backside face 38a of the compression plate than it is towards the frontside face 38b of the compression plate. The outboard edge 116 of the pressure plate 2 is similarly tapered such that the diameter to the outboard edge 116 is greater towards the backside face 2a of the pressure plate than it is towards the frontside face 2b of the pressure plate.

Arranged circumferentially around the outboard edges 115 and 116 of the compression plate 38 and the pressure plate 2, respectively, is a grip assembly (generally indicated as 300 in the figures). The grip assembly 300 is essentially an annular ring having a nominal outside diameter (23.75 inches) corresponding to the inside diameter of the pipe P, and which is cut into sixteen individual arcuate segments, with adjacent segments being nominally spaced 0.125 inches apart. The individual arcuate segments of the grip assembly are hereinafter referred to as individual "grips" 3. In the preferred embodiment of the invention, the grips 3 are constructed of zinc plated carbon steel mechanical tube which is heat treated to a Rockwell 50c hardness. Each grip 3 has a knurled or toothed outboard edge 117.

The inboard edges 119 and 120 of the grips 3 are tapered toward the center of the grip 3. The angle of taper of the inboard edges 119 and 120 of each grip 3 corresponds to the angle of taper of the outboard edges 116 and 115 of the pressure plate 2 and the compression plate 38, respectively, and is preferably 15 degrees relative to the axis A of the device. Grooves 118 in the outboard edge 117 of the grip 3 accommodate three endless garter springs 19, which preferably are constructed of stainless steel.

The resilient garter springs 19, defining a contractile means, hold the various grips 3 together against the outboard edges 116 and 115 of the pressure plate and the compression plate, respectively, and bias the grip assembly 300 inward toward the common axis A of the device.

A 9/16-inch mechanical O-ring seal 8, preferably having a nominal inside diameter of 21.75 inches, is positioned on the outboard edge 116 of the pressure plate 2, between a sidewall 121 of each grip and a lip 122 on the perimeter of the pressure plate 2.

A seal front housing 40 is attached to the backside 2a face of the pressure plate with socket head cap screws 14. The seal front housing 40 and the pressure plate 2 together form a continuous slot 123 which houses a continuous inflatable seal 15. An air supply valve 124 located in the cylindrical interior wall 125 of the pressure plate opens into an interior chamber 126 of the inflatable seal 15. An air supply tube 11, preferably constructed of ¼-inch O.D. nylon pressure tubing, is connected to the air supply valve 124 via union 50.

An air impact motor tool 4 having a housing 114 is suitably sized to fit inside the cylinder 13. The air impact motor tool 4 has a square shaft 129 which is suitably sized to slip fit into the blind square recess 110 in the head 105 of the actuation shaft 5.

Pressurized air is supplied to the air impact motor tool 4 through ½-inch I.D. polyurethane hoses 101 and 102, which drive the impact motor tool's shaft 129 clockwise and counterclockwise, respectively. A vent line 103 made of ½-inch I.D. polyurethane hose is also attached to the air impact motor tool 4.

Pressurized air can be introduced through the cavity 132 (for testing of the pipe line and valve down stream) between the pressure plate 2 and the compression plate 38 by air supplied through air hose 48 which is connected via fitting 49 threaded into a hole 133 in the pressure plate 2.

Two spaced motor retaining brackets 39 are attached to the back of the air impact motor. A retaining rod 130 having a circular cross section is connected to the two motor retaining brackets 39 and held in a fixed position relative to the back of the air impact motor tool housing 114.

A spring loaded position indicator 71 is provided on the backside 2a of the pressure plate. An externally threaded portion of a ½×¼ inch reducing adapter 64 is in threaded engagement with an internally threaded opening 134 in the pressure plate 2. A stainless steel indicator piston 69 having a sensing rod 692 and an indicator rod 691 is biased toward the compression plate 38 by a spring 66 which acts against the indicator piston 69. O-rings 67 are provided inside of the position indicator cylinder 65 to provide a seal between the cylinder 65 and the indicator piston 69. The indicator rod 691 and the sensing rod 692 of the indicator piston are each preferably 0.25 inches diameter in cross section. The sensing rod 692 of the indicator piston maintains contact with the front side face 38b of the compression plate.

Operation of the Preferred Embodiment of the Invention

The present invention is a closure device that can, in its "deactuated" mode, be inserted into the open end of a circular pipe, and then be "actuated" so as to secure itself against the interior wall of the pipe and effectively seal the pipe. The closure device 100 incorporates two separate sealing mechanisms: an inflatable seal 15 which blocks the annular space 135 between the pressure plate 2 and the inside of the pipe P when the seal is inflated; and a mechanical O-ring seal 8 that seals the annular space between the pressure plate 2 and the inside of the pipe P when the closure device 100 is actuated (tightened).

Figure 2:
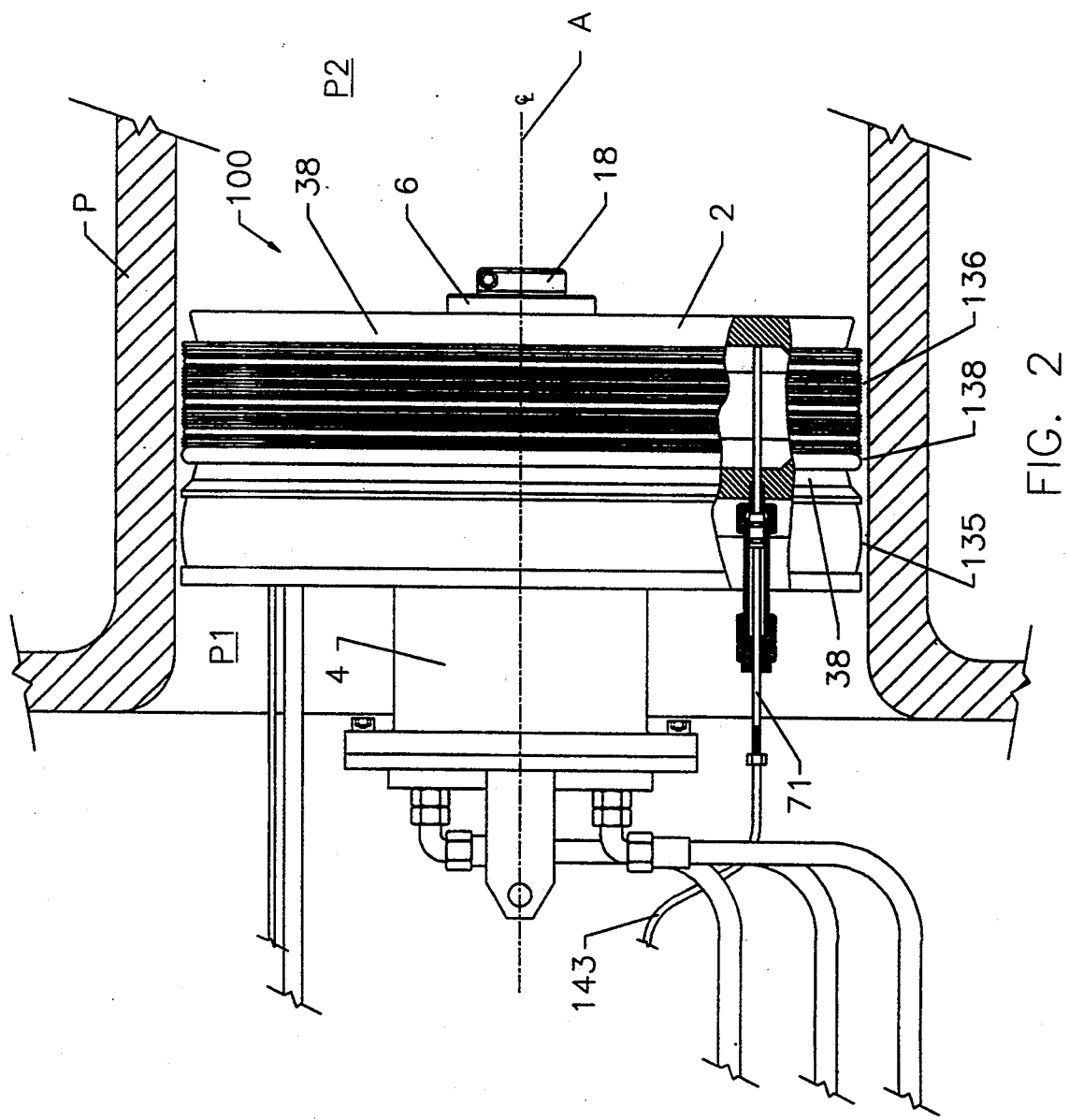
FIG. 2 is a side view of the present invention similar to FIG. 1, showing the invention in an operatively deactuated, unsealed position.
Figure 4:
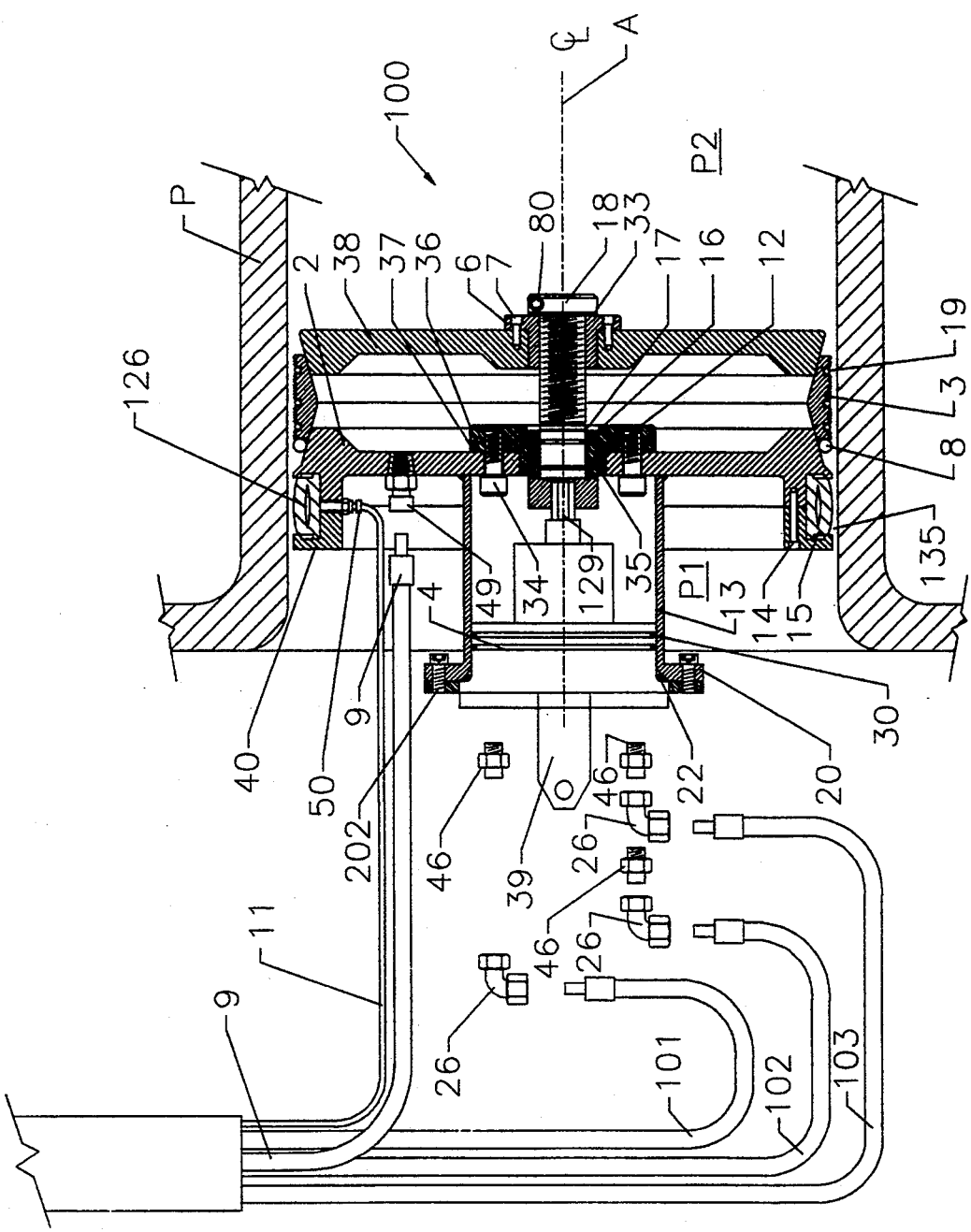
FIG. 4 is a medial cross-sectional view similar to FIG. 3, showing the invention in an operatively deactuated, unsealed position inside of a conduit.
Figure 5:
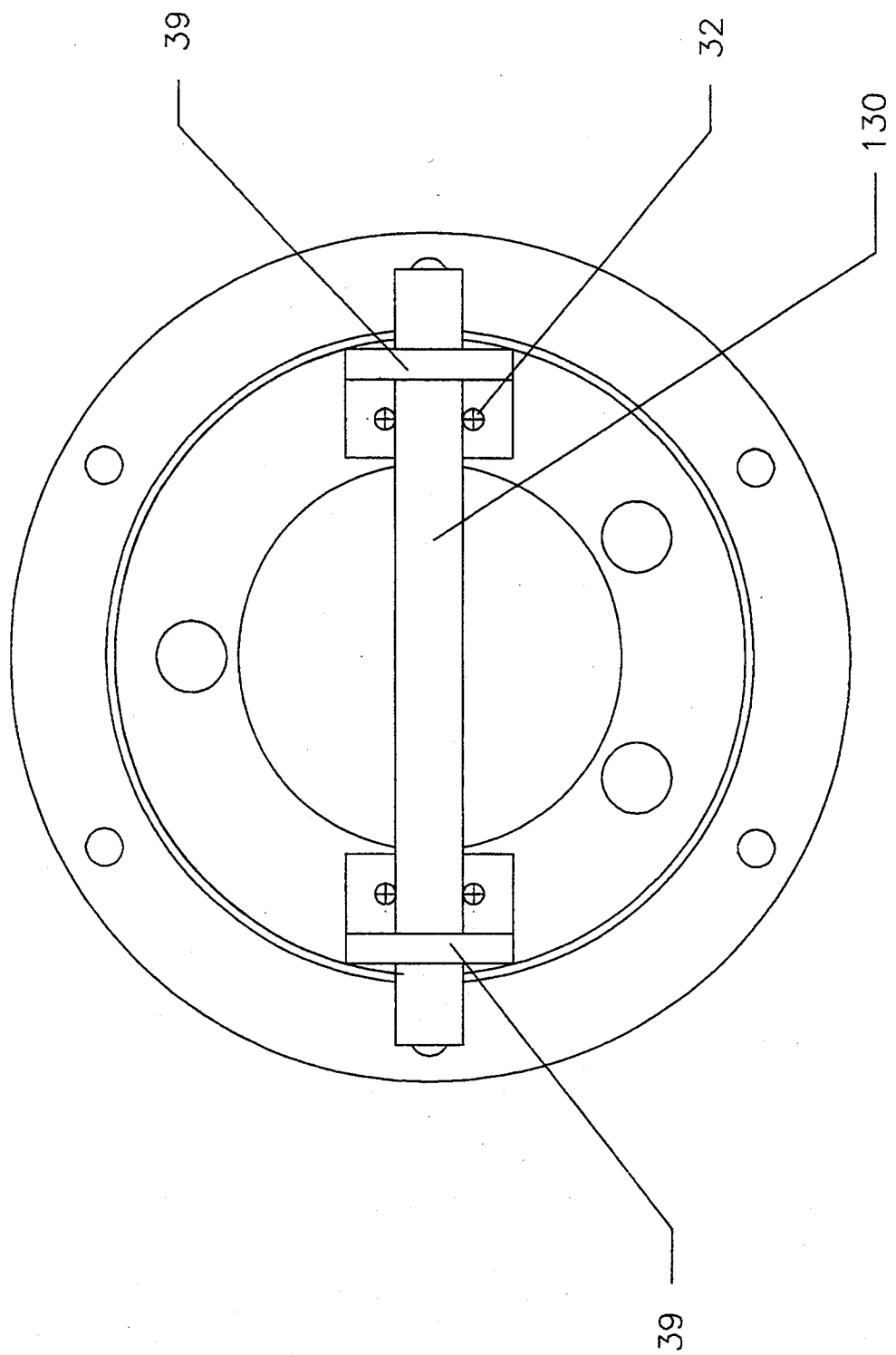
FIG. 5 is a side elevation taken along the line 5—5 of FIG. 3.
Figure 11:
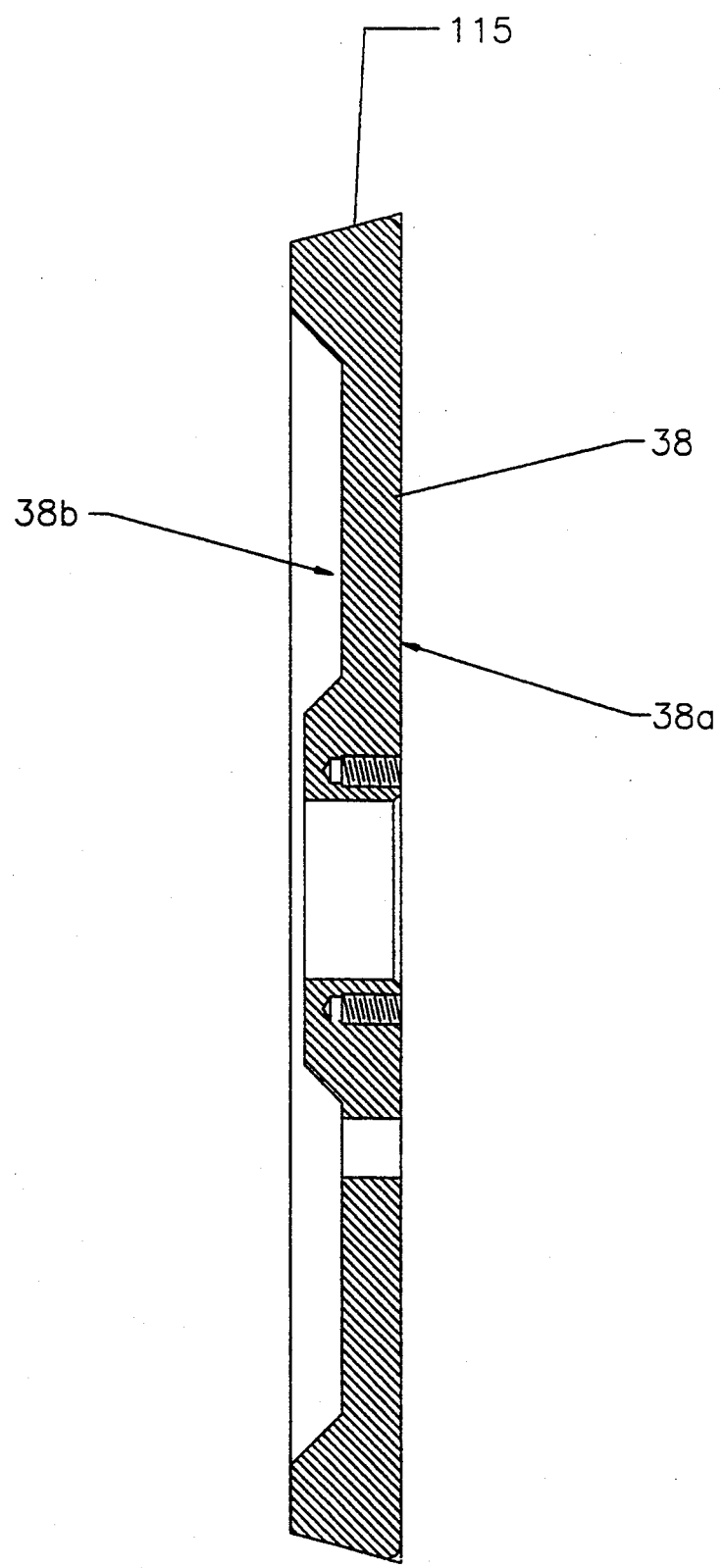
FIG. 11 is a medial cross-sectional view of the compression plate of the present invention.
Figure 12:
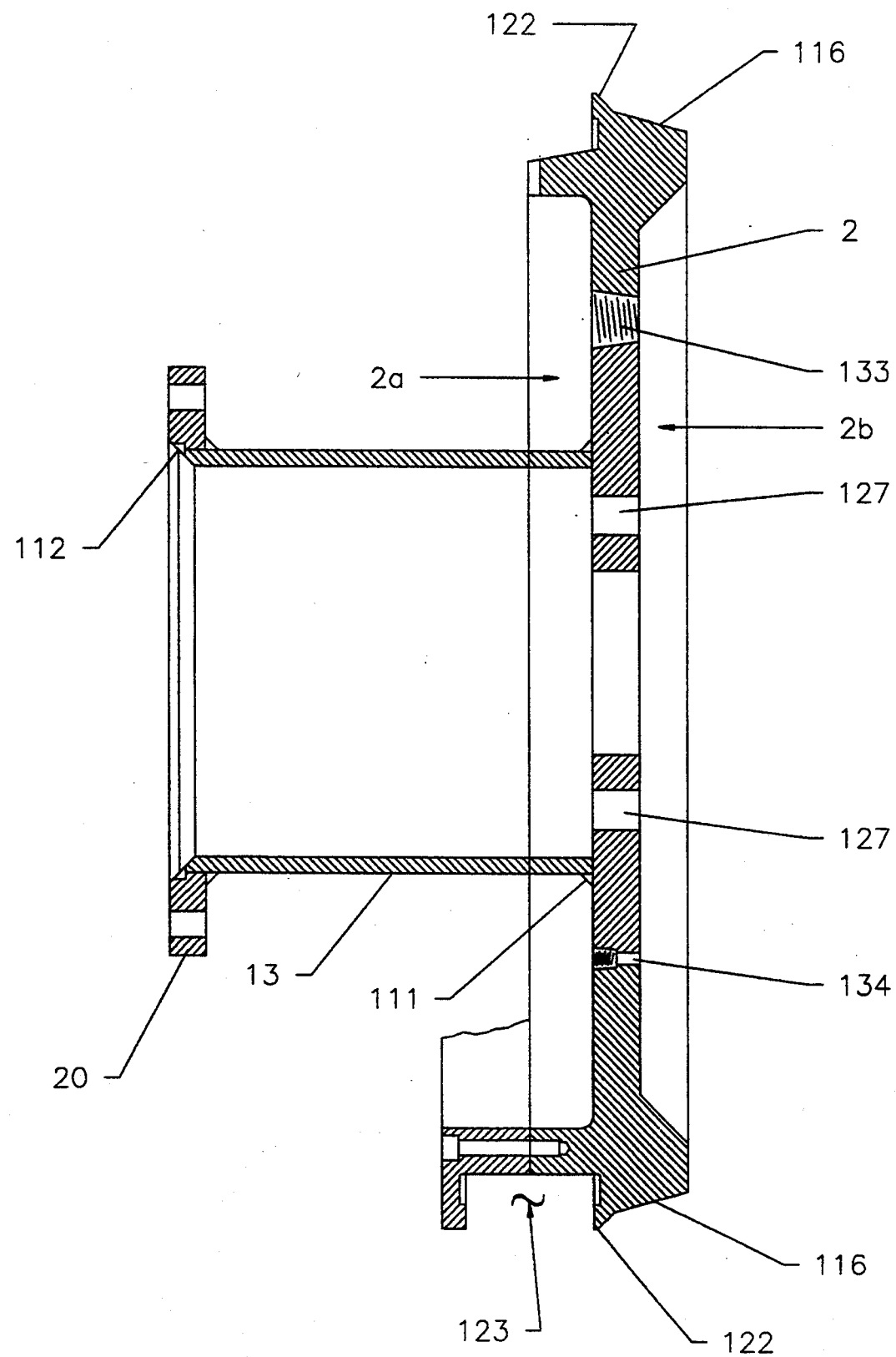
FIG. 12 is a medial cross-sectional view of the pressure plate of the present invention.

Referring to FIGS. 2 and 4: The closure device 100, while in its "deactuated" mode, is inserted into an open end of a pipe P. In its "deactuated" mode, the inflatable seal 15 is not pressurized, and, accordingly, is not inflated; and the flange nut 6 is at or nearly at the end of travel of the actuation shaft 5, such that the compression plate 38 and the pressure plate 2 are widely separated from each other.

The garter springs 19 radially draw the grips 3 against the outboard edges 116 and 115 of the pressure plate 2 and the compression plate 38, respectively, such that when the pressure plate 2 and the compression plate 38 are separated from each other the grips 3 radially draw inward, thus providing an annular gap 136 between the grip assembly 300 and the interior wall of the pipe P when the closure device is in its deactuated mode. The extent to which the outside diameter of the grip assembly 300 can be reduced is limited by the amount of space 137 between adjacent grip 3 segments when the grip assembly 300 is expanded to its maximum diameter (as illustrated in FIG. 8), and by the maximum separation obtainable between the pressure plate 2 and the compression plate 38.

When the closure device 300 is in its fully deactuated position, there is maximum radial clearance between the closure device and the interior wall of the pipe P. In the preferred embodiment of the invention, a maximum clearance of 0.5 inches between the closure device 300 and the pipe wall is realized in a pipe having a 23.75 inch inside diameter. Verification that the closure device is in the fully deactuated position is gained by visually checking to see that the flange nut 6 is adjacent the thrust nut 33 and the locknut 18, that the indicator rod 691 of the position indicator 71 piston is only minimally extending out of the position indicator cap 68, that the actuation shaft 5 does not protrude beyond the backside face 38a of the compression plate, and that the outside diameter of the grip assembly 300 is only 23.25 inches.

When the closure device 300 is in its "deactuated" mode, the mechanical O-ring seal 8, which has a nominal diameter (21.75 inches) that is less than the inside diameter (23.75 inches) of the pipe P, contracts about the tapered outboard edge 116 of the pressure plate so as to provide an annular gap 138 between the mechanical O-ring seal 8 and the pipe P.

Referring now to FIGS. 1 and 3: To actuate the closure device 300, 90 psig dry air is provided to the ¾ inch inlet port of a 4-way diverter valve 25. With the diverter valve 25 opened at port 140, pressurized air is sent to the air impact tool 4 via air hose 101, causing the air impact motor tool shaft 129 to turn in a clockwise direction. The clockwise rotation of the square shaft 129 causes the actuation shaft 5 to rotate inside of the flange bushing 35 inside of the pressure plate 2. As the actuation shaft 5 rotates in a clockwise direction, the compression plate 38 and the pressure plate 2 are drawn towards each other by axial movement of the flange nut 6 which is threadedly engaged with the actuation shaft 5. Vent hose 103 attached to vent port 142 in the air impact motor tool 4 is provided to vent air from the air impact motor tool 4 during its operation.

As the compression plate 38 and the pressure plate 2 move toward each other the tapered outboard edges 115 and 116 of the compression plate 38 and the pressure plate 2, respectively, act against the tapered inboard edges 120 and 119, respectively, of the grips 3, thereby causing the grip assembly 300 to expand radially. The grip assembly 300 expands radially (in response to clockwise rotation of the actuation shaft 5) until the grips 3 engage the interior wall of the pipe P. In the preferred embodiment of the invention, the outboard edge 117 of each grip 3 is toothed so as to enhance the pipe-gripping capabilities of the grips 3.

As the pressure plate 2 and the compression plate 38 draw together, the mechanical O-ring seal 8 is pushed (by the grip assembly 300 and the outboard edge 116 of the pressure plate 2) radially outward until it engages the interior wall of the pipe P. Further drawing together of the pressure plate 2 and the compression plate 38 causes the mechanical O-ring seal 8 to press against the wall of the pipe P, thereby sealing the pipe P.

It should be understood that, although the pressure of the mechanical O-ring seal 8 against the interior wall of the pipe P provides an effective seal between the pipe P and the closure device 100, it does not have enough shear strength to provide any substantial resistance to axial forces which may tend to push the closure device through the pipe P. In addition, regardless of the shear strength of the mechanical O-ring seal 8, there is insufficient frictional force between the mechanical O-ring seal 8 and the inside wall of the pipe P for the mechanical O-ring seal 8 to provide any substantial frictional resistance to axial movement of the closure device 300 through the pipe P. It should be understood that resistance to axial movement of the closure device through the pipe is primarily and sufficiently provided by engagement of the rigid grips 3 with the inside of the pipe P. Whereas tightening of the closure device inside of the pipe P is accomplished by tightening of the actuation shaft 5 (and the corresponding tightening of the grips 3 against the wall of the pipe P), it will be appreciated by those skilled in the art that, once the grips engage the wall of the pipe P and are seated, further tightening of the grips 3 against the wall of the pipe does not cause any significant additional pressure on, nor deformation of, the mechanical O-ring seal 8.

When the grips 3 are tightly engaged with the wall of the pipe P and the mechanical O-ring seal 8 is pressed against the wall of the pipe as described above, this condition of the closure will be visually ascertainable by inspection of the indicator rod 691 of the position indicator 71, which will be displaced rearward of the pressure plate a distance equal to the distance the compression plate has moved along the actuation shaft 5.

The inflatable seal 15 is actuated by supplying 150 psig dry air via a ¼ inch port 141 at the control console 10, through tube 11 and the air supply valve 124, into the interior chamber 126 of the inflatable seal. The inflatable seal 15 is preferably constructed to apply sufficient sealing force against the wall of the pipe P when inflated to 125 psig.

When the closure device has been fully actuated, such that the grips 3 are tightly engaged with the wall of the pipe P and the mechanical O-ring seal 8 and the inflatable seal 15 are each pressed against the wall of the pipe P, the pipe segments P1 and P2 on opposite sides of the closure device are effectively sealed off from each other.

In order to pressure test the pipe segment P2 on the compression plate 2 side of the closure device, pressurized air is introduced into the cavity 132 between the pressure plate and the compression plate via air hose 48 connected to a port 49 in the side of the pressure plate 2. Pressurized air entering the cavity 132 will pass through the plurality of spaces 137 between the individual grips 3, into the pipe segment P2 which is being pressure tested. By monitoring the air pressure in air hose 48, the integrity of the pipe segment P2 (and downstream valve) can be determined.

In order to remove the closure device 100 from the pipe P, the inflatable seal 15 is first deflated by releasing air from its interior chamber 126 via pressure tubing 11. After the inflatable seal 15 is deflated, the diverter valve 25 is reset such that port 150 is open and port 140 is closed. Pressurized air which passes through port 150 and air hose 102 to the air impact motor tool 4 causes the square shaft 129 of the tool to turn in the counter-clockwise direction, which causes the actuation shaft 5 also to turn in the counter-clockwise direction. Pressurized air supplied to the air impact motor tool 4 is vented from the tool via vent hose 103. As the actuation shaft 5 turns in the counter-clockwise direction the flange nut 6 (which is threadedly engaged with the actuation shaft) pulls the compression plate 38 away from the pressure plate 2. As the Compression plate 38 moves away from the pressure plate 2, the individual grip 3 segments of the grip assembly 300 are pulled radially inward by the garter springs 19, thereby withdrawing the grips 3 from the wall of the pipe P. As the grip assembly 300 radially contracts, the mechanical O-ring seal 8 breaks its seal with the inside wall of the pipe P.

It should be understood that the above disclosure describes a closure device which is adapted to seal a straight circular opening, using only pneumatic power both to seal and to release the device from the opening.

The present invention is particularly well adapted to be used to temporarily plug pipes P which intersect with, and open into, large-diameter open-top vessels V which are subject to flooding. An example of such an application is the temporary plugging of steam pipe lines which intersect a nuclear reactor vessel, when the vessel is flooded with water to twenty or more feet above the open end of the steam pipe. In such an environment it is desirable to be able to remotely insert and remove the closure device, and to remotely control the insertion and removal of the closure device, and to remotely actuate the closure device from a control position above the reactor vessel (i.e. above the water W). It will be appreciated that in such an environment neither the closure device 300, per se, nor the open end of the pipe P into which the closure device is to be inserted may be visible at the time of its insertion, actuation or removal.

Figure 17:
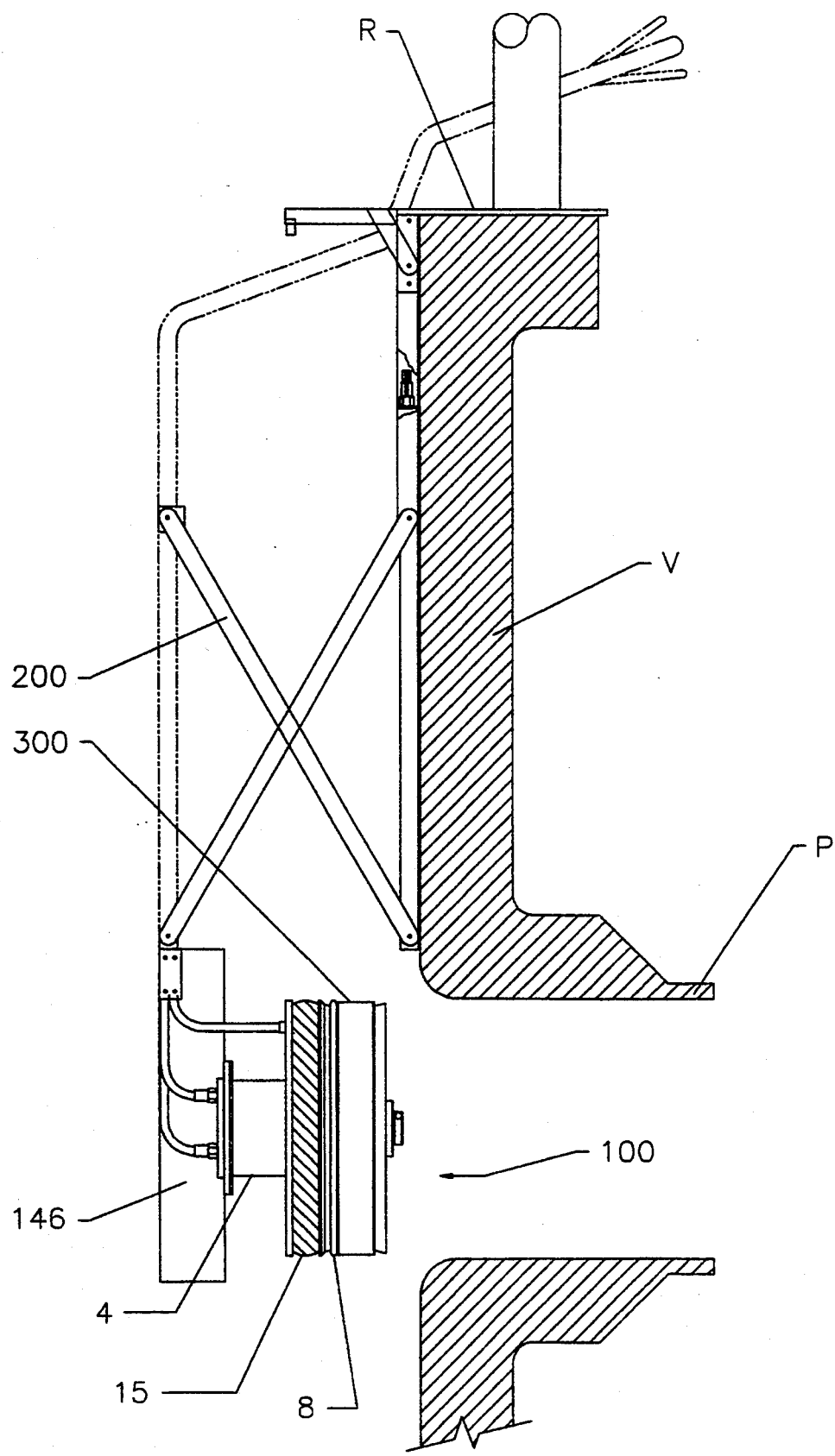
FIG. 17 is a side elevation showing the closure device of the present invention supported by an installation tool.
Figure 18:
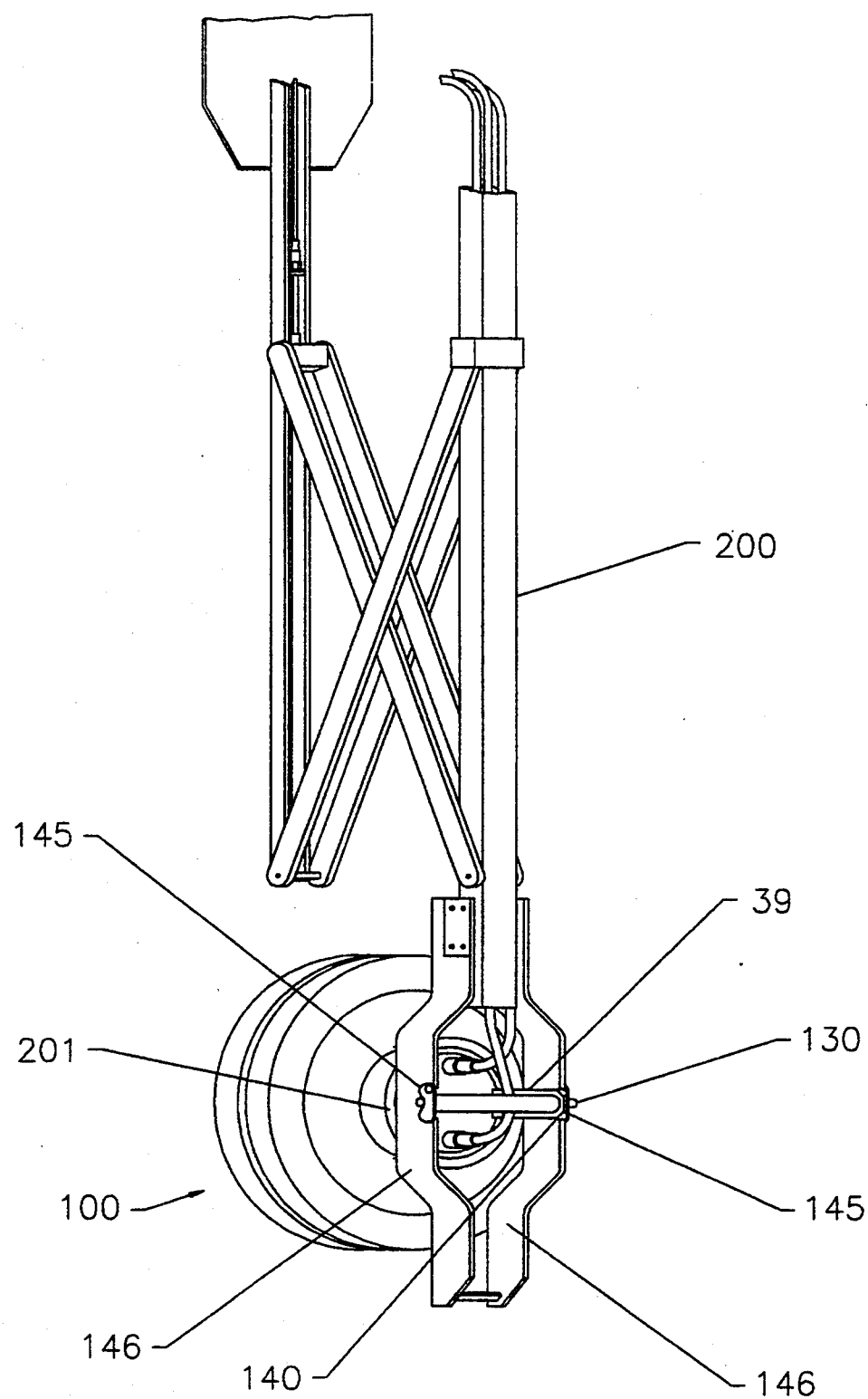
FIG. 18 is a perspective view showing the closure device of the present invention supported by an installation tool.

In order to facilitate the "blind" insertion of the closure device 100 into an open end of a pipe P located a known distance from a reference point R (such as the top of the vessel V), a fixed-length, scissors-operating, air-actuated installation tool 200 may be secured to the vessel V at the reference point R, as shown in FIG. 17. The installation tool 200 is attached to the closure device 100 by the retaining rod 130 which fits into a corresponding notch 140 having a hinged latch 145 near the bottom of the installation tool, and interface flange 201 (which is a fixed component of the installation tool 200) is secured to the flange 20 of cylinder 13 with socket head cap screws 202. By operating the installation tool 200 the closure device 100 can be inserted into the open end of a pipe P so long as the axis of the closure device is nearly aligned with the pipe P and the closure device is in the non-actuated mode.

Once inserted into the pipe P, it may be possible to determine whether or not the closure device has been fully actuated (i.e. whether or not it has sealed the pipe P) by visually looking at the position of the indicator rod 691. However, if the indicator rod 691 is not visible from the remote operating position, an indicator extension 143 long enough to be seen from a remote control position, may be attached to the indicator rod 691.

Because the preferred embodiment of the invent i on may be installed in hazardous environments and may be submerged below tens of feet of water for a long duration, it is desirable that the device be removable even in the event of failure of one or more components of the device or in the event that the device becomes "stuck" to the wall of the pipe. In the event of failure of the air impact motor tool 4, the air impact motor tool can be detached from the rest of the closure device 100 simply by opening the latches 145 so as to release the air impact motor tool's retaining rod 130. The air impact motor tool 4 can then be pulled away from the cylinder 13, between opposing struts 146 of the installation tool 200. A replacement air impact motor tool may then be attached to the installation tool 200 and subsequently re-inserted into the cylinder 13 so that the air impact motor tool shaft 129 engages the actuation shaft 5.

In the event that it becomes impossible to turn the actuation shaft 5 with the air impact motor tool 5 (for example, due to galling or corrosion, etc.), the air impact motor tool 4 may be removed from the device in the manner described above, thereby exposing the socket head cap screws 34 to the flange bushing 35. The socket head cap screws 34 can then be removed, thus removing the tensile force on the actuation shaft 5, which separates the compression plate 38 and the pressure plate 2, and releasing the grips 3, such that the individual components of the device can be individually removed. It will be appreciated that by orienting the flange bushing 35 such that its flange portion 35a is on the frontside 2b of the pressure plate, manual removal of the closure device by disassembly of the pressure plate 2 in the manner described above is facilitated.

While the above description contains many specificities, these should not be construed as limitations on the scope of the invention, but rather as an exemplification of one preferred embodiment and a limited number of modifications thereof. Accordingly, the scope of the invention should be determined not by the embodiment illustrated, but by the appended claims and their legal equivalents.

I claim:

1. A valving assembly adapted to be operatively inserted within the bore of a pipe, said pipe having a pipe wall, said valving assembly comprising:
   a first shaft member, said first shaft member having a first end and a second end, and a first length defined as the distance between said first end and said second end of said first shaft member;

a first portion of said first length of said first shaft member being externally threaded;

a first mandrel member, said first mandrel member being concentric with said first shaft member and in threaded engagement with said externally threaded first portion of said first length of said first shaft member;

a second mandrel member, said second mandrel member being concentric with said first shaft member;

said second mandrel member comprising bearing means in communication with a second portion of said first length of said first shaft member, wherein said first portion is relatively nearer to said first end of said first shaft member and said second portion is relatively nearer to said second end of said first shaft member;

said first mandrel member comprising a first cylindrical external surface and a first conical external surface, said first conical external surface enlarging toward said first end of said first shaft member;

said second mandrel member comprising a second conical external surface, said second conical external surface enlarging toward said second end of said first shaft member;

first pipe wall engaging means;

said first pipe wall engaging means comprising a plurality of rigid wall engagement members, each of said rigid wall engagement members having a partial first conical internal surface and a partial second conical internal surface and a partial second cylindrical external surface;

said partial first conical internal surface enlarging toward said second end of said first shaft member and being complementary in shape to said first conical external surface;

said partial second conical internal surface enlarging toward said first end of said first shaft member and being complementary in shape to said second conical external surface;

contractile means surrounding said first pipe wall engaging means and maintaining each of said rigid wall engaging members in contact with said first mandrel member and said second mandrel member;

said partial second cylindrical external surface having a radius substantially equivalent to the inside radius of said pipe;

second wall engaging means;

said second wall engaging means comprising a continuous resilient first elastomeric member;

said continuous resilient first elastomeric member surrounding said second conical external surface of said second mandrel member;

third wall engaging means;

said third wall engaging means comprising an inflatable second elastomeric member;

said inflatable second elastomeric member having a first cylindrical internal surface in contact with said first cylindrical external surface;

means for selectively inflating and deflating said inflatable second elastomeric member, so as to cause said inflatable second elastomeric member to engage said wall of said pipe when said inflatable second elastomeric member is inflated and so as to cause said inflatable second elastomeric member to disengage said wall of said pipe when said inflatable second elastomeric member is deflated;

and means for rotating said first shaft member, whereby said rotation of said first shaft member in a first direction causes said first mandrel member to move toward said second mandrel member and whereby rotation of said first shaft member in a second direction causes said first mandrel member to move away from said second mandrel member.

2. The invention according to claim 1 wherein:

said each of said rigid wall engagement members comprises a first planar surface perpendicular to the axis of said first shaft member;

and said second mandrel member comprises a continuous external lip member;

and wherein said second wall engaging member is disposed between said first planar surface and said continuous lip member.

3. The invention according to claim 2 further comprising:

a stop member at said first end of said first shaft member, whereby said stop member limits the range of axial movement of said first mandrel member in the direction of said first end of said first shaft member.

4. The invention according to claim 3, wherein said means for rotating said first shaft member comprises an air-powered motor;

said air-powered motor comprising a second shaft member and a motor housing;

and wherein said first shaft member comprises a blind recess adapted to mate with said second shaft member;

and further comprising means for temporarily securing said air-powered motor in a fixed position relative to said second mandrel member.

5. The invention according to claim 4 wherein said means for temporarily securing said air-powered motor in a fixed position relative to said second mandrel member comprises:

a receiver member rigidly attached to said second mandrel member, said receiver member comprising a continuous wall member effecting an interior and an exterior to said receiver member;

said continuous wall member of said receiver member having a first end and a second end, said first end of said continuous wall being continuously secured to and sealed to said second mandrel member;

wherein said housing of said air-powered motor is adapted to be inserted into the interior of said receiver member;

and further comprising means for sealing said housing of said air-powered motor to the interior of said continuous wall of said receiver member.

6. The invention according to claim 5, wherein said bearing means in communication with said second portion of said first length of said first shaft member comprises:

a flange bearing having a bearing cylinder and a bearing cylinder flange, said bearing cylinder flange having an outside diameter greater than an outside diameter of said bearing cylinder;

and wherein said flange bearing is secured to said second mandrel member by threaded fasteners, and wherein said flange bearing is concentric with said first shaft member, and said bearing cylinder flange is relatively nearer to said first end of said first shaft member than is said bearing cylinder;

and wherein said threaded fasteners threadedly engage said bearing cylinder flange.

* * * * *